United States Patent
Fisher et al.

(10) Patent No.: US 8,717,933 B2
(45) Date of Patent: May 6, 2014

(54) METHOD AND APPARATUS FOR INTERACTIVE ROUTING

(75) Inventors: Kenneth M. Fisher, Aurora, IL (US); David W. Jenkins, North Aurora, IL (US); Ramasubramanian Anand, Plainfield, IL (US); Abhishek J. Desai, North Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1084 days.

(21) Appl. No.: 11/936,379

(22) Filed: Nov. 7, 2007

(65) Prior Publication Data

US 2008/0291925 A1 Nov. 27, 2008

Related U.S. Application Data

(60) Provisional application No. 60/931,839, filed on May 25, 2007.

(51) Int. Cl.
*H04L 12/24* (2006.01)
*H04L 12/56* (2006.01)

(52) U.S. Cl.
CPC ............... *H04L 45/10* (2013.01); *H04L 41/12* (2013.01); *H04L 41/22* (2013.01)
USPC ......................................... 370/254

(58) Field of Classification Search
None
See application file for complete search history.

(56) References Cited

U.S. PATENT DOCUMENTS

| | | | |
|---|---|---|---|
| 6,259,679 B1 | 7/2001 | Henderson et al. | |
| 6,313,093 B1 * | 11/2001 | Frey, II | 424/450 |
| 6,314,093 B1 * | 11/2001 | Mann et al. | 370/351 |
| 6,807,190 B1 | 10/2004 | Kremer | |
| 7,167,483 B1 | 1/2007 | Sharma et al. | |
| 7,730,012 B2 * | 6/2010 | Arrouye et al. | 1/1 |
| 7,797,425 B2 * | 9/2010 | Ettle et al. | 709/226 |
| 2002/0036988 A1 * | 3/2002 | Cardwell et al. | 370/238 |
| 2002/0114031 A1 * | 8/2002 | Yamada | 359/119 |
| 2003/0099014 A1 | 5/2003 | Egner et al. | |
| 2004/0027384 A1 | 2/2004 | Levesque et al. | |
| 2004/0249621 A1 | 12/2004 | Alicherry et al. | |
| 2005/0185967 A1 | 8/2005 | Hoshida | |
| 2007/0161371 A1 * | 7/2007 | Dobrowski et al. | 455/423 |
| 2008/0267078 A1 | 10/2008 | Farinacci et al. | |
| 2008/0298239 A1 | 12/2008 | Anand et al. | |

FOREIGN PATENT DOCUMENTS

EP 0 791 880 A1 8/1997

* cited by examiner

*Primary Examiner* — John Blanton
*Assistant Examiner* — Christopher Crutchfield
(74) *Attorney, Agent, or Firm* — Fitzpatrick, Cella, Harper & Scinto

(57) ABSTRACT

A method to provision routes in a network having a plurality of nodes and a plurality of links connecting various nodes. The method includes determining a route between a designated source node and a designated destination node based on a preselected routing algorithm and one of (i) a designated node of interest and (ii) a designated link of interest, and outputting information indicating the determined route.

21 Claims, 7 Drawing Sheets

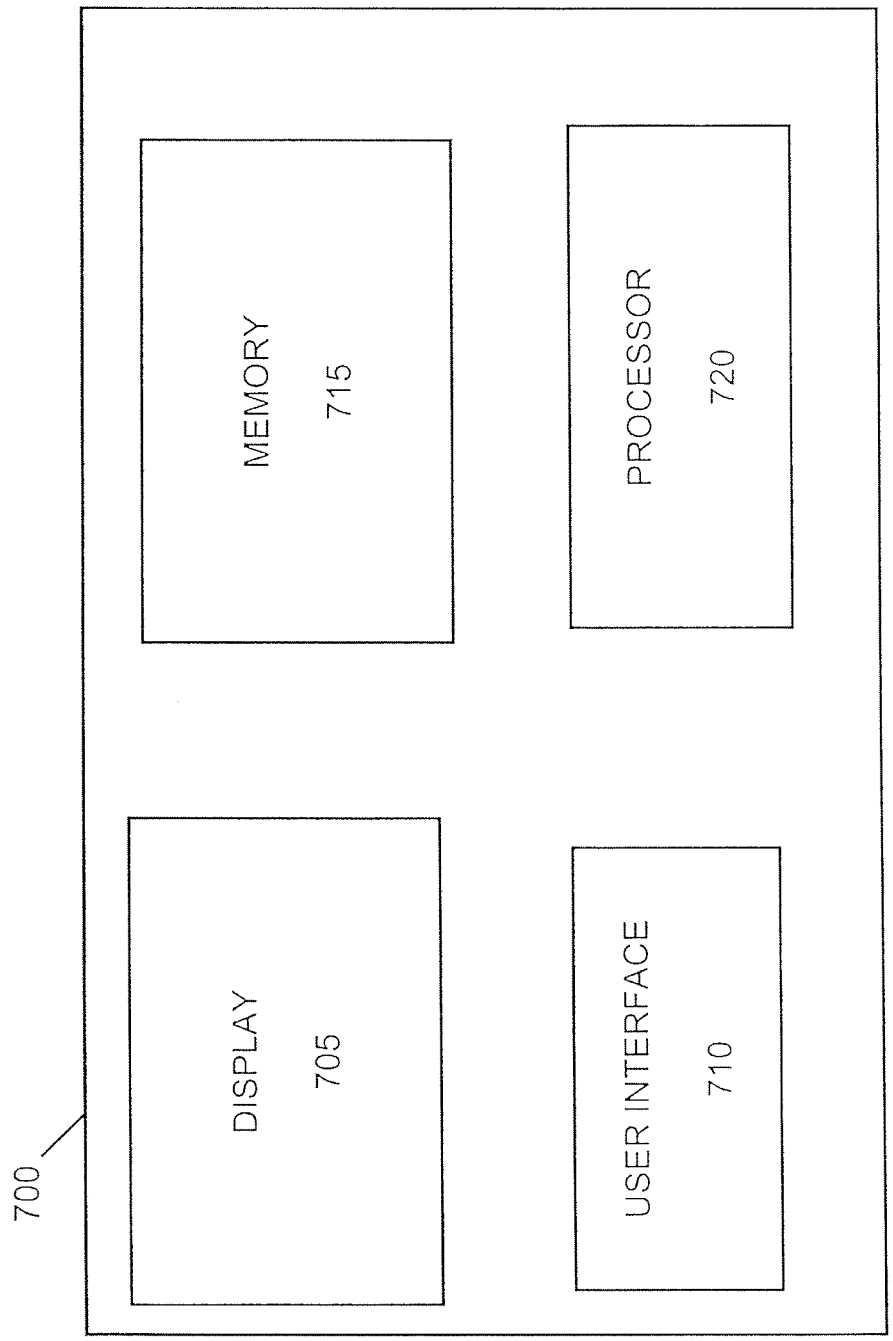

METHOD AND APPARATUS FOR INTERACTIVE ROUTING

CROSS-REFERENCE TO RELATED APPLICATION

This application claims the benefit of priority of U.S. Provisional Application No. 60/931,839, filed May 25, 2007, which is herein incorporated by reference.

BACKGROUND

1. Field

Example aspects of the present invention generally relate to provisioning routes in a network and, more particularly, to methods and apparatus to provision routes interactively.

2. Description of the Related Art

In a communication network having a plurality of interconnected nodes, there may be multiple routes that data can traverse from a source node to a drop node (i.e., a node where the data will be used). There may be a direct link between the source node and the drop node, and/or there may be a plurality of routes from the source node to the drop node via one or more intermediate nodes. Particular routes between a source node and each drop node are provisioned (i.e., established) so that network equipment knows how to route data to a particular drop node. The information regarding provisioned routes can be stored in a routing table that a node uses to determine the appropriate route to send or forward data (the routing table can be stored in a computer program memory, for example), or the network can be engineered to ensure that data flows in a certain way (i.e., network equipment can be wired or cabled to constrain the flow of data in a specific direction).

Various techniques are known for automatically provisioning network routes to optimize transmission characteristics. For example, techniques are known that automatically optimize the signal-to-noise ratio (SNR) or that automatically determine the shortest path between nodes, the fewest number of links to be traversed between nodes, or the minimum cost path between nodes (where a weighted value or "cost" is assigned to each network link). However, these optimizing techniques do not account for factors other than transmission characteristics that may be important to a network planner.

SUMMARY OF THE INVENTION

According to one example aspect of the present invention, a method is provided to provision routes in a network having a plurality of nodes and a plurality of links connecting various nodes. The method includes determining a route from a designated source node to a designated destination node based on a preselected routing algorithm and one of (i) a designated node of interest and (ii) a designated link of interest. The method further includes outputting information to indicate the determined route.

According to yet another example aspect of the present invention, a method is provided to provision routes in a network having a plurality of nodes and a plurality of links connecting various nodes. The method includes determining an initial route between a source node and a destination node using a preselected routing algorithm, determining a revised route between the source node and the destination node based on one of (i) a designated node of interest and (ii) a designated link of interest, and outputting information to indicate the revised route.

According to still another example aspect of the present invention, a method is provided to provision routes in a network having a plurality of nodes and a plurality of links connecting various nodes. The method includes designating a source node on a display of network nodes, designating a destination node on the display of network nodes, inputting a command to initiate determination of an initial route between the source node and the destination node using a preselected routing algorithm, designating, on a display of network nodes that includes information indicating the initial route, one of (i) a node of interest and (ii) a link of interest, and inputting a command to initiate determination of a revised route between the source node and the destination node based on the designated node of interest or link of interest.

According to yet another example aspect of the present invention, an apparatus to provision routes in a network is provided that has a memory to store information regarding a plurality of network nodes and links connecting network nodes, a display to display information regarding the plurality of network nodes and the links connecting the network nodes, and a user interface to input user designations. The apparatus further includes a processor to control the apparatus to (i) determine an initial route between a designated source node and a designated destination node using a preselected routing algorithm, (ii) determine a revised route between the source node and the destination node based on one of (a) a designated node of interest and (b) a designated link of interest, and (iii) output information to the display to indicate the revised route.

According to a further example aspect of the present invention, a computer-readable medium embodying a computer program is provided. The computer program includes code to control an apparatus to determine an initial route between a source node and a destination node in a network having a plurality of nodes and a plurality of links connecting various nodes, using a preselected routing algorithm, determine a revised route between the source node and the destination node based one of (i) a designated node of interest and (ii) a designated link of interest, and output information to indicate the revised route.

These and other aspects of the present invention will be described in further detail below, with reference to the accompanying drawings.

BRIEF DESCRIPTION OF THE DRAWINGS

FIG. 7 illustrates an example embodiment of an apparatus to determine a route based on a link of interest.

DETAILED DESCRIPTION

An example embodiment of a procedure to provision routes in a network will be described with respect to FIGS. 1 to 4. The network in this example embodiment is a mesh network in which one or more nodes have multiple degrees, i.e., they have communication links with more than two other nodes so that upon receiving incoming data on one link, there is more than one choice of link for outputting or forwarding the data.

Provisioning routes in a network having nodes with multiple degrees can be complex. One approach used to achieve diverse routing in a mesh network has been to divide the mesh network into plural ring networks. In a ring network, each node is linked to just two other nodes, so traffic received on one link is always sent out on the other link, and vice versa. Diverse routing is achieved within each ring by routing the unidirectional traffic in opposite directions along the ring.

This example embodiment will be described in the context of a mesh network in which routes are provisioned as rings containing the source node and the destination node. However, those skilled in the art will appreciate that this is merely one example embodiment of the present invention, which is not limited to mesh networks divided into rings and, further, is not limited to mesh networks.

Figure 1:
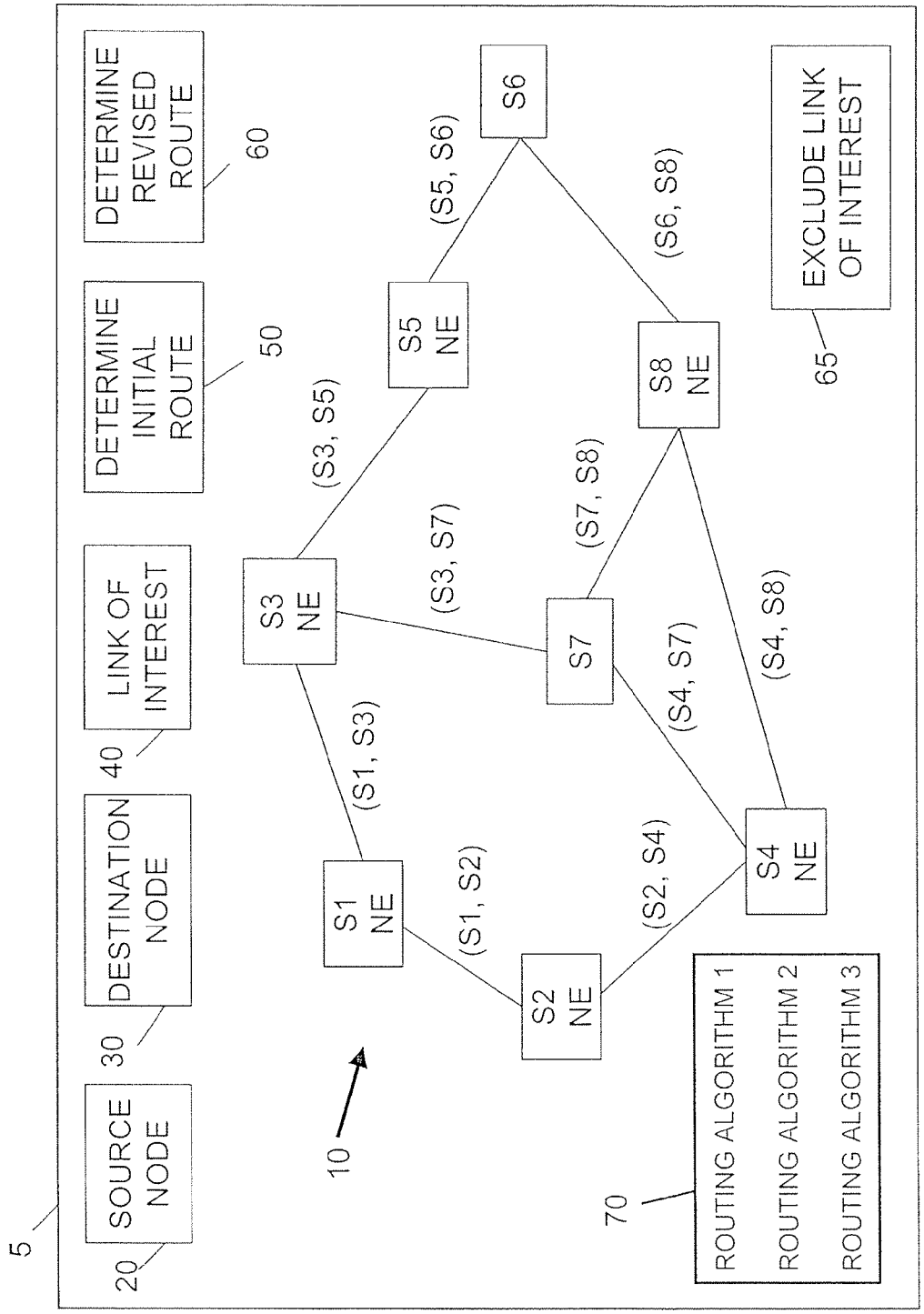
FIG. 1 illustrates a display of a network having a plurality of nodes and a plurality of links, to which an example embodiment of the present invention may be applied.

FIG. 1 illustrates a display 5 showing a network 10 having multiple nodes, numbered S1 to S8. Display 5 also includes soft buttons 20, 30, 40, 50, 60, and 65 for respectively designating a currently selected node as a source node, designating a currently selected node as a destination node, designating a currently selected link as a link of interest, inputting a command to determine an initial route, inputting a command to determine a revised route, and selecting whether to include or exclude a link of interest from the revised route.

Some of the nodes in network 10 include network equipment that can serve as a drop node, i.e., a node where the data can be used. On the other hand, some of the nodes are so-called "glass" nodes. Glass nodes do not contain network equipment that allow the node to serve as a drop node. For example, a glass node may merely include a signal repeater, a patch panel, or some other interface connecting two different transmission links or different types of transmission links. In FIG. 1, nodes S1-S5 and S8 are nodes having network equipment, as indicated by the label "NE" at those nodes, and nodes S6 and S7 are glass nodes.

As shown in FIG. 1, there are links interconnecting various nodes. In the example embodiment these links are optical fiber links, but the links are not limited to optical fibers. The links are designated using a pair of node numbers corresponding to the nodes connected by the link. For example, the link between node S1 and node S2 is designated (S1, S2), and the link between node S3 and node S4 is designated (S3, S4).

A route can be determined between a source node and a destination node, where the destination node can be either a drop node or a glass node. In this example embodiment, a route will be determined that includes node S1 as the source node and node S8 as the destination node. The information representing the nodes and links of the network is displayed graphically in this example embodiment, as shown in FIG. 1. A user can designate node S1 as the source node, for example, by using a mouse to move a cursor over node S1 and clicking a mouse button. In this example embodiment, node S1 is highlighted to provide a visual indication that it has been selected. The user then clicks on soft button 20 to designate node S1 as the source node. Similarly, the user selects node S8 and clicks on soft button 30 to designate node S8 as the destination node.

Next, the user can initiate determination of an initial route by clicking on soft button 50. As mentioned above, in this example embodiment a route is determined as a ring that includes the source node and the destination node. Various algorithms are known for determining an optimal or near-optimal route based on various criteria. For example, known algorithms will determine a route based on the shortest number of spans or the least cost (taking into account distance, transmission speed, etc.). Information regarding characteristics of the nodes and links interconnecting various nodes is stored in memory, for example, and can be read and used in executing a routing algorithm.

In this example embodiment, a list or drop-down menu 70 is provided from which the user can select a desired algorithm to use in determining an initial route. The user selects the desired algorithm using a mouse and the clicks on soft button 50.

Figure 2:
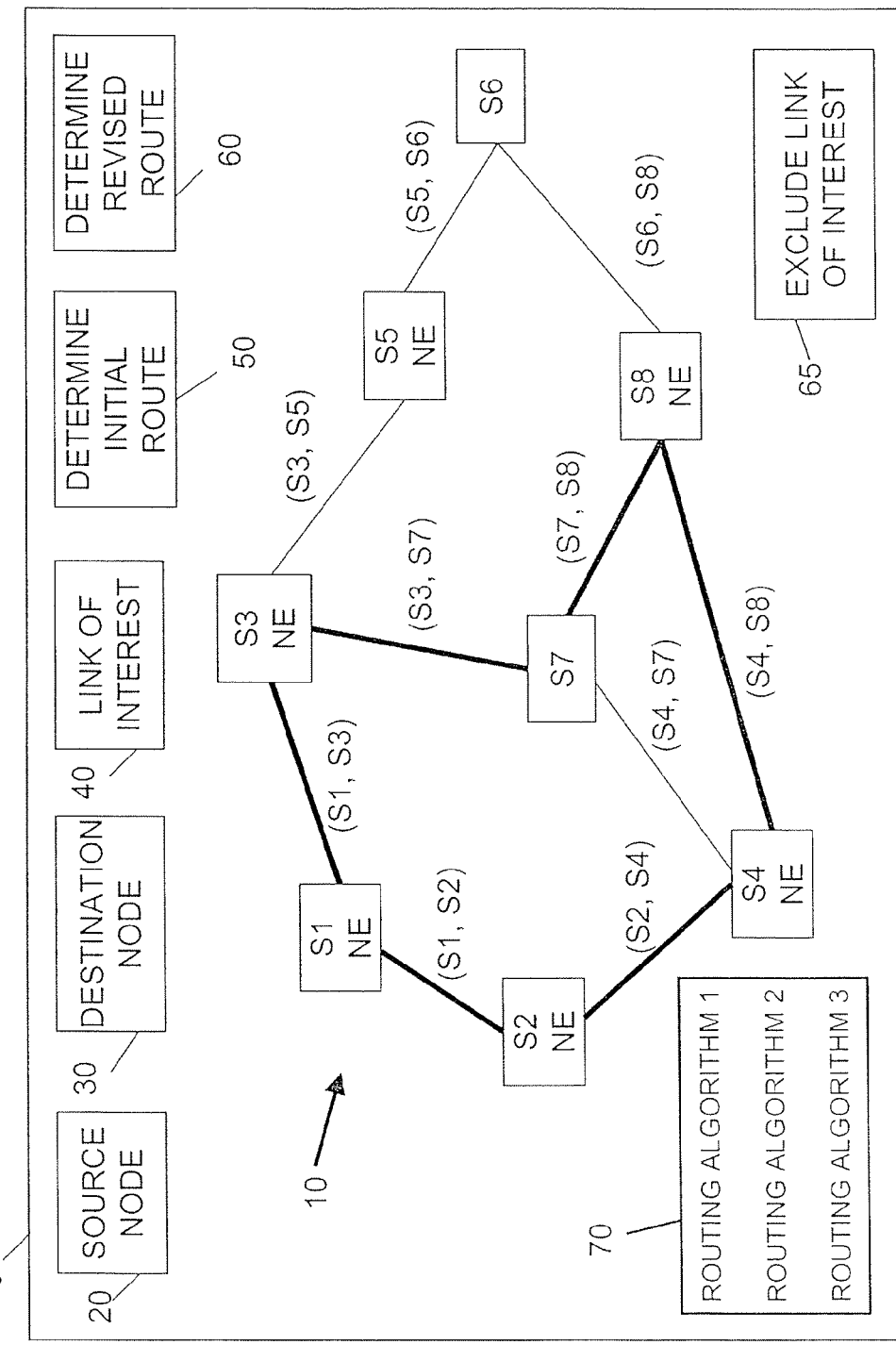
FIG. 2 illustrates a display of a network in which the links included in an initial route are emphasized

FIG. 2 illustrates a result of determining an initial route for source node S1 and destination node S8 using the algorithm designated from menu 70. The links included in the determined route are highlighted on the display. Those links are: (S1, S2), (S1, S3), (S3, S7), (S7, S8), (S4, S8), and (S2, S4). This route is the optimal route based on the transmission characteristics emphasized by the selected routing algorithm (i.e., routing technique).

However, it is often the case that a network planner or provider needs to consider factors other than simply the transmission characteristics considered by known routing algorithms. For example, certain links may be underutilized if routes are provisioned using the optimizing algorithms. Also, certain links may be prone to failure due to the type of equipment or quality of the installation, frequent storms, etc. Other exemplary factors may relate to office power, tariffs and other factors relating to geographical boundaries, and other potential "danger zones" where outages may occur due to various factors.

Figure 3:
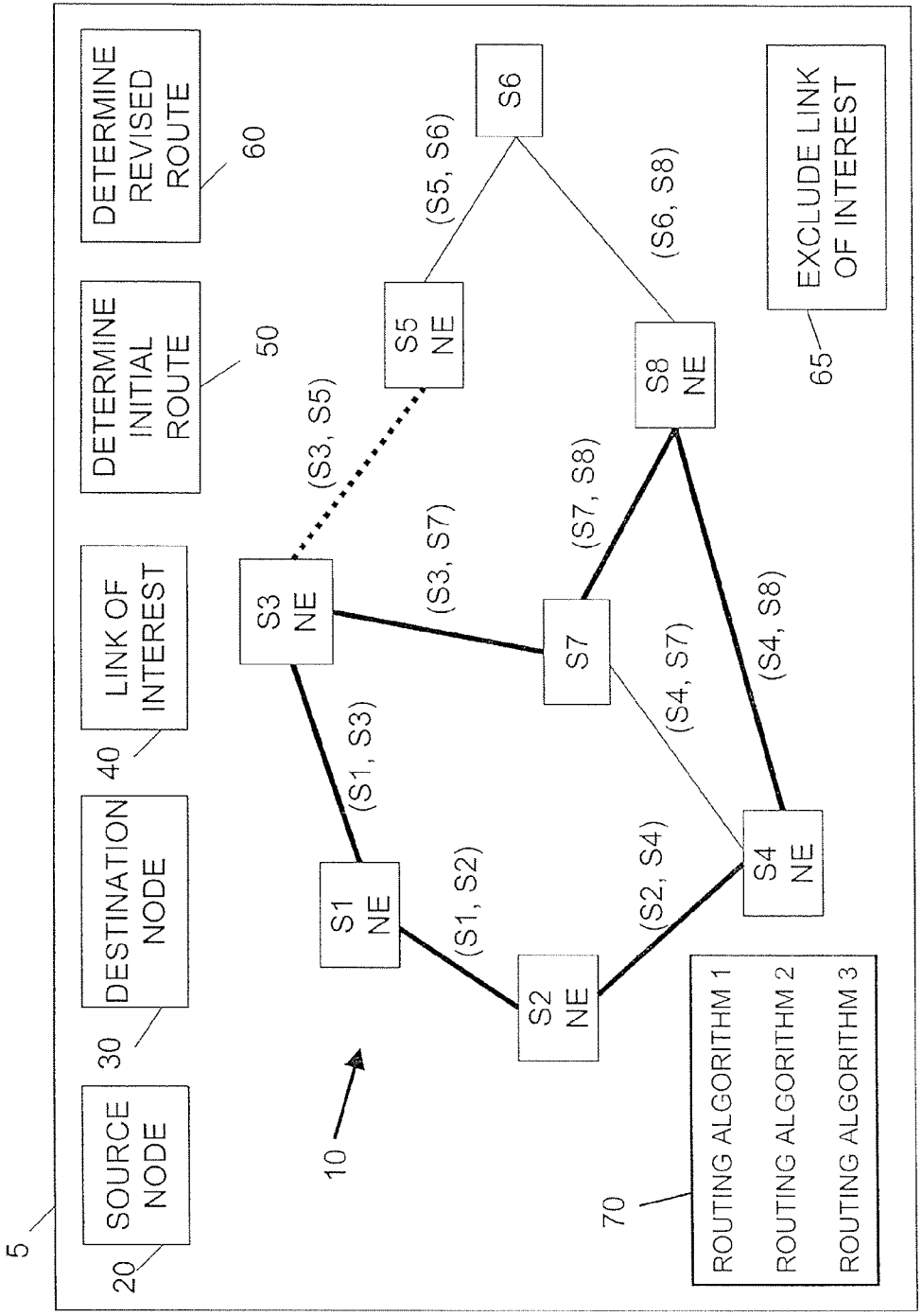
FIG. 3 illustrates a display of a network in which a link designated as a link of interest is emphasized.

In this example embodiment, a user can designate a link of interest which is not included in the initial route but which the user wishes to include in the route for source node S1 and destination node S8. For example, the user may wish to include link (S3, S5) in the route. The user can select the link by using the mouse to select that link and then clicking on soft button 40 to designate link (S3, S5) as the link of interest. FIG. 3 shows the display with the initial route highlighted (e.g., by bolding or using a different color or line type) and with the link of interest (S3, S5) highlighted or emphasized differently (in this example, using a bold dotted line). In this example embodiment, the default setting is to include the designated link of interest in the revised route. If instead the user wishes to exclude the link of interest from the revised route, the user can click on soft button 65 to set a mode where the link of interest is excluded from the revised route.

Figure 4:
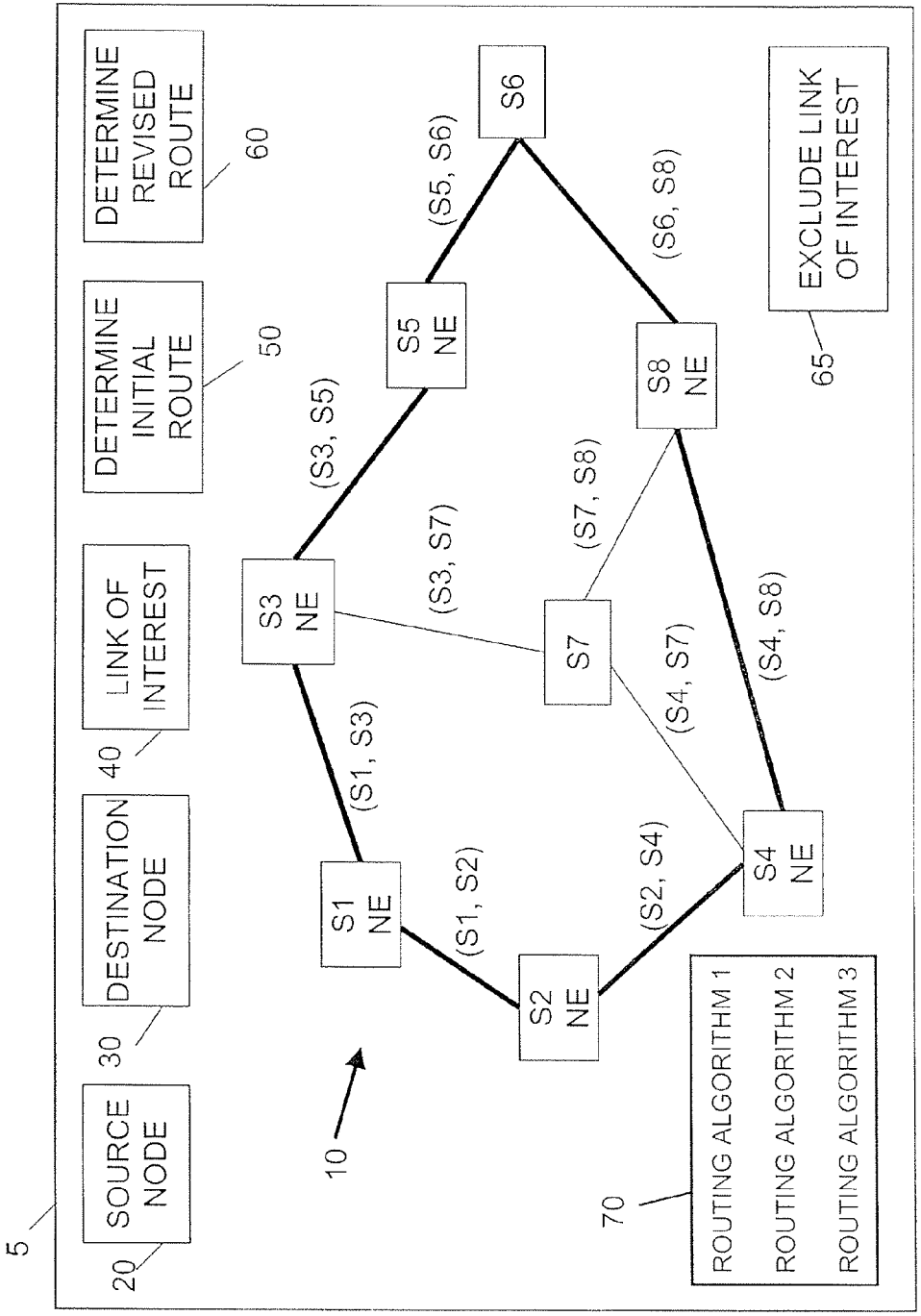
FIG. 4 illustrates a display of a network in which the links included in a revised route are emphasized.

The user then clicks on soft button 60 to initiate determination of a revised route. A revised route that alters the initial route and includes the link of interest (i.e., link (S3, S5) in this example) is determined and information indicating the route is displayed. FIG. 4 shows the network with the links forming the revised route highlighted. The links included in the revised route are: (S1, S2), (S1, S3), (S3, S5), (S5, S6), (S6, S8), (S4, S8), and (S2, S4).

The revised route uses some of the optimized characteristics of the initial route, but also includes the designated link of interest. In this manner, the user can provision a route that takes into account both optimization of transmission characteristics and other factors that make it desirable to include the link of interest in the route, with a minimum amount of user interaction.

Determination of the revised route can be performed in various ways. In this example embodiment, a first route including the source node and the node at one end of the link of interest is determined, and a second route including the node at the other end of the link of interest and the destination node is determined. First, the nodes forming the link of interest are compared to the links forming the initial route, to determine whether the link of interest includes a node that is already part of the initial route. In this example, node S3 of the link of interest (S3, S5) is already included in the initial route (in links (S1, S3) and (S3, S7)). Since a route including the node at one end of the link of interest is already known (i.e., the initial route), the initial route can be used as the first route. Then, it is only necessary to determine a second route including the node at the other end of the link of interest (node S5) and the destination node S8. Accordingly, a second route is determined using node S5 as the source node and node S8 as the destination node. The second route is determined using a preselected routing algorithm (e.g., a preset algorithm that is always used, or an algorithm selected by a user from a menu or list). In this example embodiment, the second route is determined by determining a ring that includes node S5 and node S8, using an algorithm that finds routes with the fewest links. In particular, the second route determined in this example embodiment includes the links (S5, S6), (S6, S8), (S7, S8), (S3, S7), and (S3, S5).

Next the first route and the second route are combined. However, the combination will likely include unnecessary links that should be removed. In this example, links (S3, S7) and (S7, S8) are unnecessary and should be removed. In this example embodiment, unnecessary links are removed by comparing the list of links in the first route and the list of links in the second route, and removing links duplicated in both routes. An alternative procedure is to examine the links to detect a node that appears in three or more links. Since each node in a proper ring appears in only two links (incoming link and outgoing link), a node that appears in three or more links indicates a point where the combination of the first and second routes has a branch point. In this example, node S3 is determined to be a branch point, where data from source node S2, arriving at node S3 via link (S1, S3), can follow either link (S3, S7) or link (S3, S5). Since link (S3, S5) is the link of interest, it must be retained and therefore link (S3, S7) should be removed. Further, other links including node S7 (i.e., link (S4, S7)) should also be removed.

Those skilled in the art will appreciate that the link of interest may not include a node that is part of the initial route. For example, if the designated link of interest were link (S5, S6) instead of link (S3, S5), neither of nodes S5 or S6 is part of the initial route. In this example, an alternative approach may be used to determine the first route. Rather than use the initial route as the first route, the first route can be determined using a routing algorithm. Preferably this is the same routing algorithm used to determine the initial route, but it need not be the same one. A determination is made as to which end of the link of interest is nearest to the source node, and the node at that end of the link is deemed a first node of interest (S5 in this example) while the node at the opposite end of the link of interest is deemed a second node of interest (S6 in this example). Then, the first route is determined by executing the routing algorithm using the source node S2 as the source node and using the first node of interest (S5) as the destination node. Next, the second route is determined by executing the routing algorithm using the second node of interest (S6) as the source node and using the destination node S8 as the destination node. The first route and the second route are combined, and unnecessary links are eliminated. It should be further noted that this alternative example embodiment can be used even in the case where the link of interest includes a node that is part of the initial route.

Although the example embodiment described above has been described in one particular context, those skilled in the art will recognize that many variations are possible. For example, it is not necessary that the determined routes be rings, as in the example embodiment. Instead, the routes could simply be "linear" routes between a source node and a destination node. Also, it is not necessary that an initial route be determined and then modified to determine a revised route. Instead, in response to designation of a source node, a destination node, and a link of interest, a route can be determined without first determining an initial route between the source node and the destination node. In particular, a first route can be determined between the source node and a node at one end of the link of interest, and a second route can be determined between the node at the other end of the link of interest and the destination node, and then a route based on the first route and the second route can be determined.

Also, although the example embodiment was described in the context of designating a link of interest, it will be apparent that a link of interest is really a pair of nodes of interest. Accordingly, the invention can also be applied to designating a node of interest, instead of a link of interest. For example, a route can be determined by determining a first route between the source node and the node of interest, determining a second route between the node of interest and the destination node, and appropriately combining the first and second routes (with elimination of unnecessary links).

Further, while the above example embodiment described designating a link of interest to be included in a revised route, it will be apparent to those skilled in the art that the link of interest could be specifically excluded from the revised route. For example, if the initial route between a source node and a designation node includes a link that the user wishes to exclude, that link can be designated as a link of interest. Stored data concerning the nodes and links can be temporarily or logically modified to appear as if the link of interest does not exist, and a routing algorithm can be executed to determine a revised route that excludes the link of interest.

Further, multiple links of interest can be designated. For example, if two links of interest are designated, then through routes are determined and combined. A determination is made as to which link of interest, and which node of that link, is closest to the source node. A first route is determined from the source node to the closest node of the closest link of interest, a second route is determined from the other node of the closest link of interest to the closest node of the other link of interest, and a third route is determined from the other node of the other link of interest to the destination node. The three routes are combined and unnecessary links are eliminated.

In addition, it is not necessary that designations be done with a graphical user interface. The designated source node, destination node, and link of interest can be selected from a list or a menu, or designated in some other way. Likewise, the output information indicating the revised route need not be output as highlighted links on a graphical display. Instead, the output information could be in the form of a list and may output to a display or to another device. Further, the designations and output need not be performed by and/or used by a human user. Instead, a data processing apparatus (for example, an apparatus incorporated into network equipment at a node) can retrieve information from memory, receive signals transmitted to it, or otherwise determine a source node, a designation node, and a link of interest based on information available to the apparatus. The apparatus can then perform the procedure to determine a revised route, and output information indicating the revised route in a form that may be used by other apparatuses or other network equipment, for example, to configure a network element or switch to route data in accordance with the determined revised route.

Figure 5:
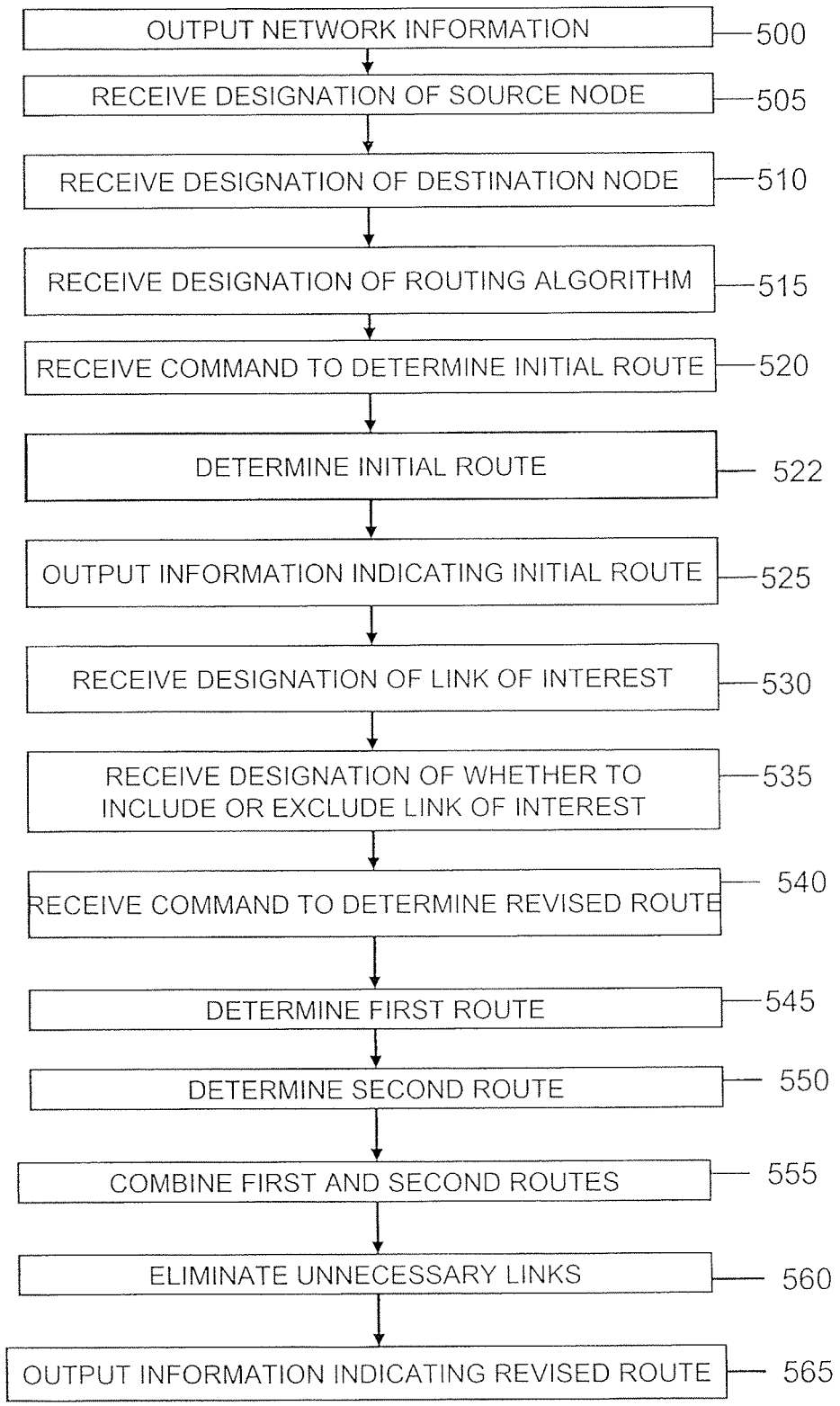
FIG. 5 illustrates an example embodiment of a procedure to determine a route that includes a link of interest.

An example embodiment of a procedure to determine a route including a link of interest will be discussed with respect to FIG. 5. In block 500, network information is output. In this example embodiment, the information is output in the form of an interactive graphical display, but it could be in the form of a list or some other form. Next, in block 505, a designation of a source node is received. In this example embodiment, the designation is received in response to a user selecting a node on a graphical display using a mouse and then selecting a particular soft button on the display. In block 510, a designation of a destination node is received. As with the designation of the source node, this designation is received in the example embodiment in response to a user's selection of a node on a graphical display followed by selection of a particular soft button.

In block 515, a designation of a routing algorithm is received. In this example embodiment, the designation is received in response to a user's selection of a routing algorithm from a menu on a display. Alternatively, the routing algorithm could be determined automatically by an apparatus based on network characteristics or some other parameter, or the routing algorithm may be fixed in advance in software or hardware. In this regard, the term preselected algorithm may refer to an algorithm that is preselected by the user from among several choices, prior to determination of a route, or one that is preselected by the system designer.

In block 520, a command to determine an initial route is received. In this example embodiment, that command is received in response to a user's selection of a particular soft button on a graphical display. In block 522, an initial route is determined. In this example embodiment, the initial route is determined using a preselected routing algorithm with the designated source node and destination node as the inputs. In block 525, information is output indicating the initial route. In this example embodiment, the output information involves highlight the links included in the initial route on a graphical display.

In block 530, a designation of a link of interest is received. In this example embodiment, the designation is received in response to a user selecting a link on a graphical display and the selecting a particular soft button on the display. Then, in block 535, a designation of whether to include or exclude the link of interest is received. In this example embodiment, this designation is received in response to a user selecting a particular soft button on a graphical display. In particular, in this example embodiment the default setting is to include the link of interest, and designation to exclude the link of interest is received when a user selects the appropriate soft button. Alternatively, whether to include or exclude the link of interest from the revised route could be determined automatically. For example, if the designated link of interest is not included in the initial route, then it will be included in the revised route, and if the link of interest is included in the initial route, then it will be excluded from the revised route. Then, in block 540, a command to determine the revised route is received.

Next, in block 545, a first route is determined. In this example embodiment, the first route is determined using a preselected routing algorithm and using as its inputs the designated source node and one node of the designated link of interest. Next, in block 550, a second route is determined. In this example embodiment, the second route is determined using the same preselected routing algorithm as the first route and using as its inputs the other node of the designated link of interest and the designated destination node.

Next, in block 555, the first and second routes are combined. After that, in block 560, unnecessary links are eliminated. In this example embodiment, the unnecessary links are eliminated by determining nodes that have extra branches in the combination of the first and second routes. That is, each node should appear in two links (the incoming link and the outgoing link from the node). If a node appears in three links, it has more than one possible outgoing link (i.e., an extra branch). One of the branches (i.e., outgoing links) is eliminated, namely, the one that does not correspond to or lead to the link of interest. Other links in the eliminated branch, if any, are also eliminated.

In block 565, information indicating the revised route is output. In this example embodiment, this information is output by highlighting on a graphical display the links that make up the revised route.

An example embodiment of a procedure to use a planning tool to determine a route including a link of interest will be described with respect to FIG. 6. In block 600, the user designates a source node and then in block 610 the user designates a destination node. In this example embodiment, the user makes these designations by selecting a node on a graphical display and then selecting an appropriate soft button on the display. Then, in block 615, the user selects a routing algorithm. In this example embodiment, the user selects the routing algorithm from a menu of available algorithms displayed on a display.

In block 620, the user inputs a command to initiate determination of an initial route. In this example embodiment, this command is input by selecting a particular soft button on a graphical display. Then, in block 625, the user designates a link of interest. In this example embodiment, this designation is made by selecting a link on a graphical display and then selecting a particular soft button.

In block 630, the user designates whether to include or exclude the link of interest. In this example embodiment, the link of interest is included in a revised route as the default, and the user designates that the link of interest should be excluded by selecting a particular soft button on a display. In block 635, the user inputs a command to initiate determination of a revised route. In this example embodiment, the user inputs this command by selecting a particular soft button on a graphical display.

Figure 6:
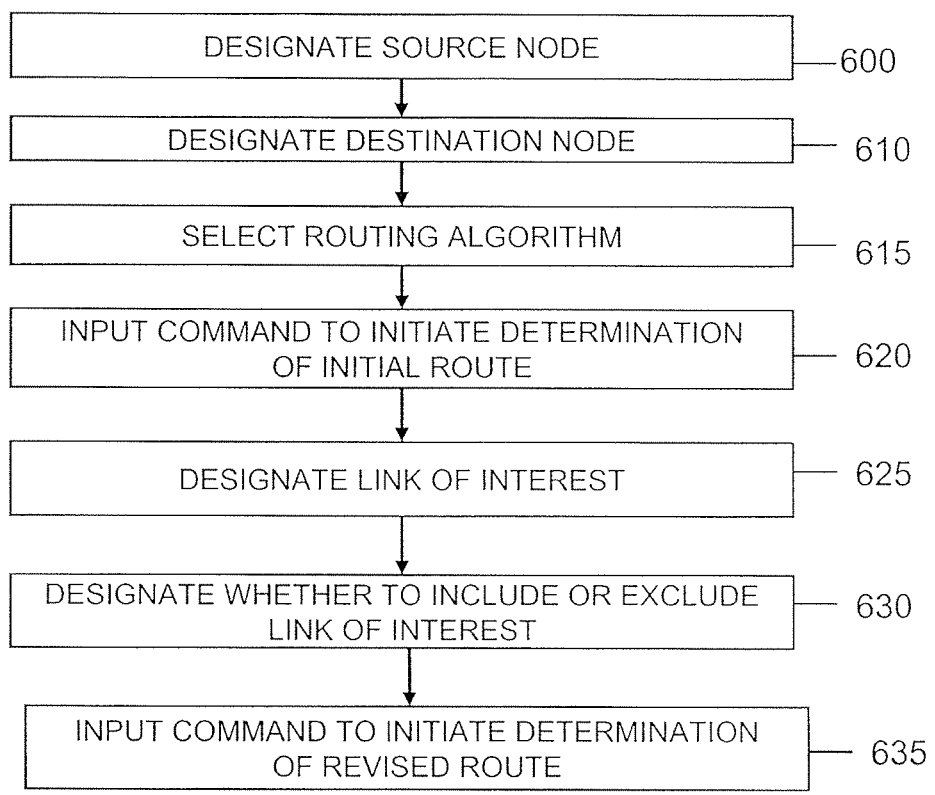
FIG. 6 illustrates an example embodiment of a procedure followed by a user to determine a route including a link of interest.

Using the procedure shown in FIG. 6, a user can interactively determine a revised route between a source node and a destination node that includes (or excludes) a particular link of interest. Accordingly, the user can take into consideration factors that may indicate a particular link should be included, for example, other than the transmission characteristics accounted for or optimized by conventional routing algorithms.

FIG. 7 illustrates an example embodiment of an apparatus to determine network routes. As shown in FIG. 7, an apparatus 700 includes a display 705 and a user interface 710, such as a mouse. Apparatus 700 also includes a memory 715 to store information regarding network nodes, links, and routes. While memory 715 is illustrated as a single memory, those skilled in the art will appreciate that it may include multiple memory devices, which may be of different types, and may provide memory for storing control programs and working memory used during information processing and/or display.

FIG. 7 further includes a processor 720 to control the apparatus. In this example embodiment, processor 720 executes program code stored in memory 715, which causes the apparatus to perform a method as described with respect to the example embodiments discussed above. The program code may, for example, be stored in a read-only section of memory 715, be stored on a removable computer-readable medium and transferred to apparatus 700, or be downloaded to apparatus via a communication link, e.g., via the internet. Also, those skilled in the art that rather than a processor or computer executing program code, apparatus 700 could be controlled by an equivalent hardware circuit providing the same functions.

Although this invention has been described in certain specific example embodiments, many additional modifications and variations would be apparent to those skilled in the art. It is therefore to be understood that this invention may be practiced otherwise than as specifically described. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention. Thus, the present embodiments of the invention should be considered in all respects as illustrative and not restrictive, the scope of the invention to be determined by any claims supportable by this application and the claims' equivalents rather than the foregoing description.

Software embodiments of the present invention may be provided as a computer program product, firmware, or software, that may include an article of manufacture on a machine accessible or machine readable medium (memory) having instructions. The instructions on the machine accessible or machine readable medium may be used to program a computer system or other electronic device. The machine-readable medium may include, but is not limited to, floppy diskettes, optical disks, CD-ROMs, and magneto-optical disks or other types of media/machine-readable medium suitable for storing electronic instructions. The techniques described herein are not limited to any particular software configuration. They may find applicability in any computing or processing environment. The terms "machine accessible medium," "computer readable medium" or "machine readable medium" used herein (if at all) shall include any medium that is capable of storing, encoding, or embodying a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs.

In addition, it should be understood that the figures illustrated in the drawing sheets, which highlight example functional aspects and uses of the present invention, are presented for example purposes only. The architectural aspects of the present invention are sufficiently flexible and configurable, such that it may be utilized (and navigated) in ways other than that shown in the accompanying figures.

Furthermore, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the procedures recited in the claims need not be performed in the order presented.

We claim:

1. A procedure to provision routes in a network having a plurality of nodes and a plurality of links connecting various nodes, comprising:
   selecting a routing algorithm from at least two routing algorithms;
   designating a source node, a destination node, and one of a node of interest and a link of interest;
   determining on a computer a ring that includes the designated source node and the designated destination node based on the selected routing algorithm and the one of a node of interest and a link of interest, the selected routing algorithm being executed on the computer; and
   outputting information to indicate the determined ring,
   wherein the determining includes (i) determining a first ring, (ii) determining a second ring, (iii) combining the first ring and the second ring, and (iv) eliminating unnecessary links in the combination of the first ring and the second ring.

2. A procedure according to claim 1, wherein the designation of the source node, the destination node, and the one of a node of interest and a link of interest is performed on a graphical display, and the outputting includes outputting information to indicate the determined ring on the graphical display.

3. A procedure according to claim 1, wherein the determined ring excludes the one of a node of interest and a link of interest.

4. A procedure according to claim 1, wherein the determined ring includes the one of a node of interest and a link of interest.

5. A procedure according to claim 4, wherein the one of a node of interest and a link of interest is a link of interest, and
   wherein the first ring includes the source node and a node at one end of the link of interest and the second ring includes a node at the other end of the link of interest and the destination node.

6. A procedure to provision routes in a network having a plurality of nodes and a plurality of links connecting various nodes, comprising:
   determining on a computer an initial route between a source node and a destination node using a preselected routing algorithm, the preselected routing algorithm being executed on the computer;
   displaying the initial route on a display;
   designating one of a link of interest and a node of interest on the display;
   revising the initial route between the source node and the destination node based on the one of a link of interest and a node of interest, the revising including (i) determining a first new route, (ii) determining a second new route, (iii) combining the first new route and the second new route, and (iv) eliminating unnecessary links in the combination of the first new route and the second new route; and
   outputting information to indicate the revised route.

7. A procedure according to claim 6, wherein the one of a link of interest and a node of interest is a node of interest, and wherein the revised route excludes the node of interest.

8. A procedure according to claim 6, wherein the one of a link of interest and a node of interest is a link of interest, and wherein the revised route excludes the link of interest.

9. A procedure according to claim 6, wherein the one of a link of interest and a node of interest is a link of interest, and wherein the revised route includes the link of interest.

10. A procedure according to claim 9, wherein the first new route includes the source node and a node at one end of the link of interest and the second new route includes a node at the other end of the link of interest and the destination node.

11. A procedure according to claim 10, wherein determining the revised route is performed using the preselected routing algorithm.

12. A procedure according to claim 9, wherein the first new route is based on the initial route and the second new route is based on the initial route.

13. A procedure according to claim 9, wherein determining the initial route includes determining a ring that includes the source node and the destination node, and
wherein the revised route is a ring that includes the source node, the destination node, and the designated link of interest.

14. A procedure according to claim 9, wherein determining the initial route includes determining a ring that includes the source node and the destination node,
wherein the first new route is a ring that includes source node and a node at one end of the link of interest, and
wherein the second new route is a ring that includes a node at the other end of the link of interest and the destination node.

15. A procedure to provision routes in a network having a plurality of nodes and a plurality of links connecting various nodes, comprising:
designating a source node on a display of network nodes;
designating a destination node on the display of network nodes;
inputting a command to determine an initial route between the source node and the destination node using a preselected routing algorithm;
displaying the initial route on the display of network nodes;
designating, on the display of network nodes, one of a node of interest and a link of interest; and
inputting a command to revise the initial route between the source node and the destination node based on the one of a node of interest and a link of interest, the command including instructions to (i) determine two new routes, (iii) combine the two new routes, and (iii) eliminate unnecessary links in the combination of the two new routes.

16. A procedure according to claim 15, further comprising:
selecting a preselected routing algorithm to be used in the determination of the initial route.

17. A procedure according to claim 15, further comprising:
selecting whether a revised route is to include the one of a node of interest and a link of interest or exclude the one of a node of interest and a link of interest.

18. An apparatus to provision routes in a network, comprising:
a memory to store information regarding a plurality of network nodes and links connecting network nodes;
a display to display information regarding the plurality of network nodes and the links connecting the network nodes;
a user interface to input user designations; and
a processor to control the apparatus to
(i) determine an initial route between a source node and a destination node using a preselected routing algorithm,
(ii) display the initial route on the display,
(iii) revise the initial route between the source node and the destination node based on one of a designated node of interest and a designated link of interest, the one of a designated node of interest and a designated link of interest being designated on the display, the revising including determining a first new route, determining a second new route, combining the first new route and the second new route, and eliminating unnecessary links in the combination of the first new route and the second new route, and
(iv) output information to the display to indicate the revised route.

19. An apparatus according to claim 18, wherein when the one of a designated node of interest and a designated link of interest is a designated link of interest, the first new route includes the source node and a node at one end of the designated link of interest and the second new route includes a node at the other end of the designated link of interest and the destination node.

20. An apparatus according to claim 18, wherein determining the initial route includes determining a first ring that includes the source node and the destination node, and
wherein revising the second route is a ring that includes the destination node and the one of a designated node of interest and a designated link of interest.

21. A non-transitory computer-readable medium embodying a computer program, the program comprising code to control an apparatus to:
determine an initial route between a source node and a destination node in a network having a plurality of nodes and a plurality of links connecting various nodes, using a preselected routing algorithm;
display the initial route on a display;
revise the initial route between the source node and the destination node based on one of a designated node of interest and a designated link of interest, the one of a designated node of interest and a designated link of interest being designated on the display, the revising including determining a first new route, determining a second new route, combining the first new route and the second new route, and eliminating unnecessary links in the combination of the first new route and the second new route; and
output information to indicate the revised route.

* * * * *